Sept. 23, 1924.
W. L. DAYTON
1,509,641
POWER JACK FOR COMPRESSORS AND THE LIKE
Filed Sept. 19, 1922      5 Sheets-Sheet 1
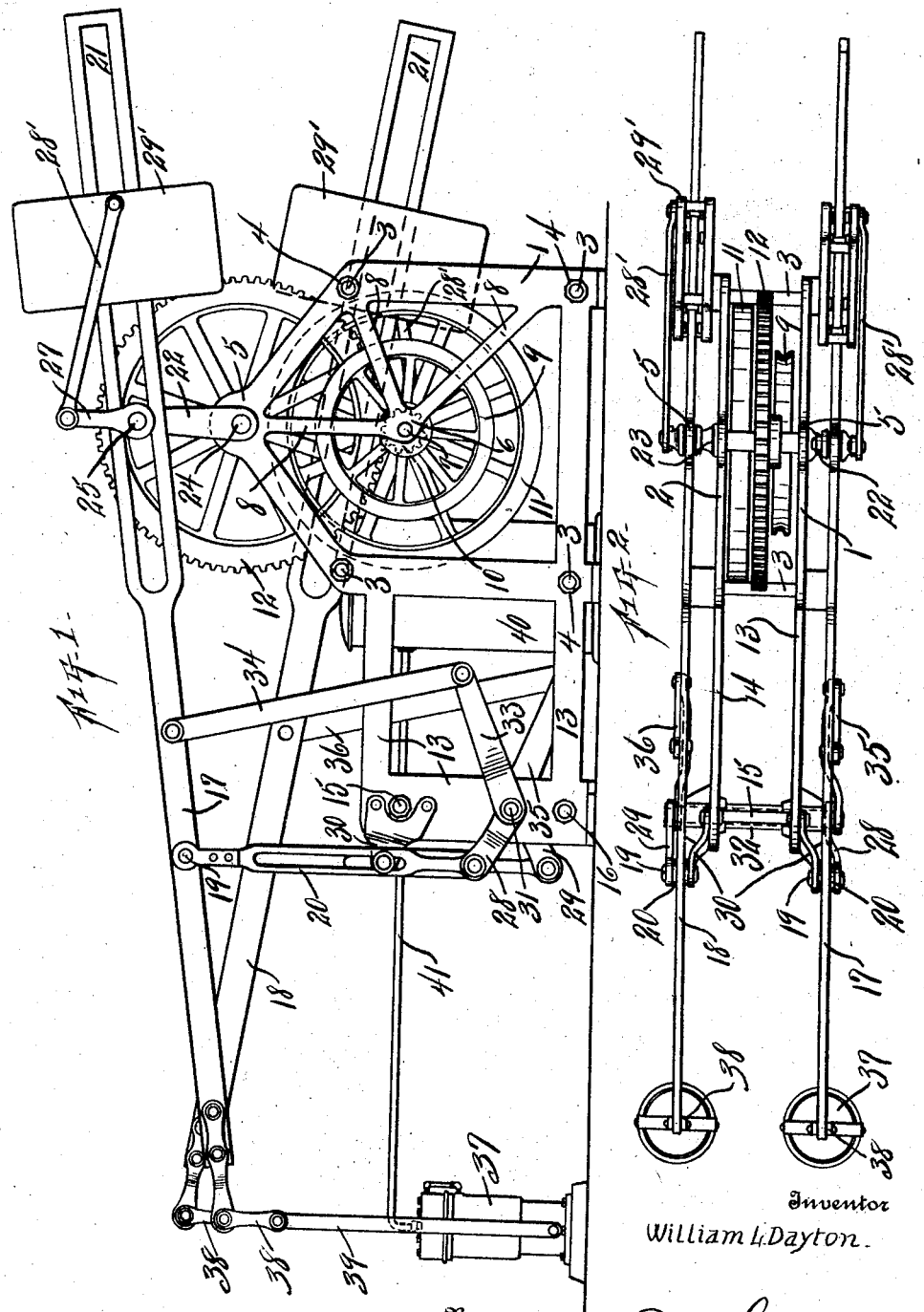
Inventor
William L. Dayton.
By A. L. Jackson
Attorney Sept. 23, 1924.  
W. L. DAYTON  
1,509,641  
POWER JACK FOR COMPRESSORS AND THE LIKE  
Filed Sept. 19, 1922  
5 Sheets-Sheet 2
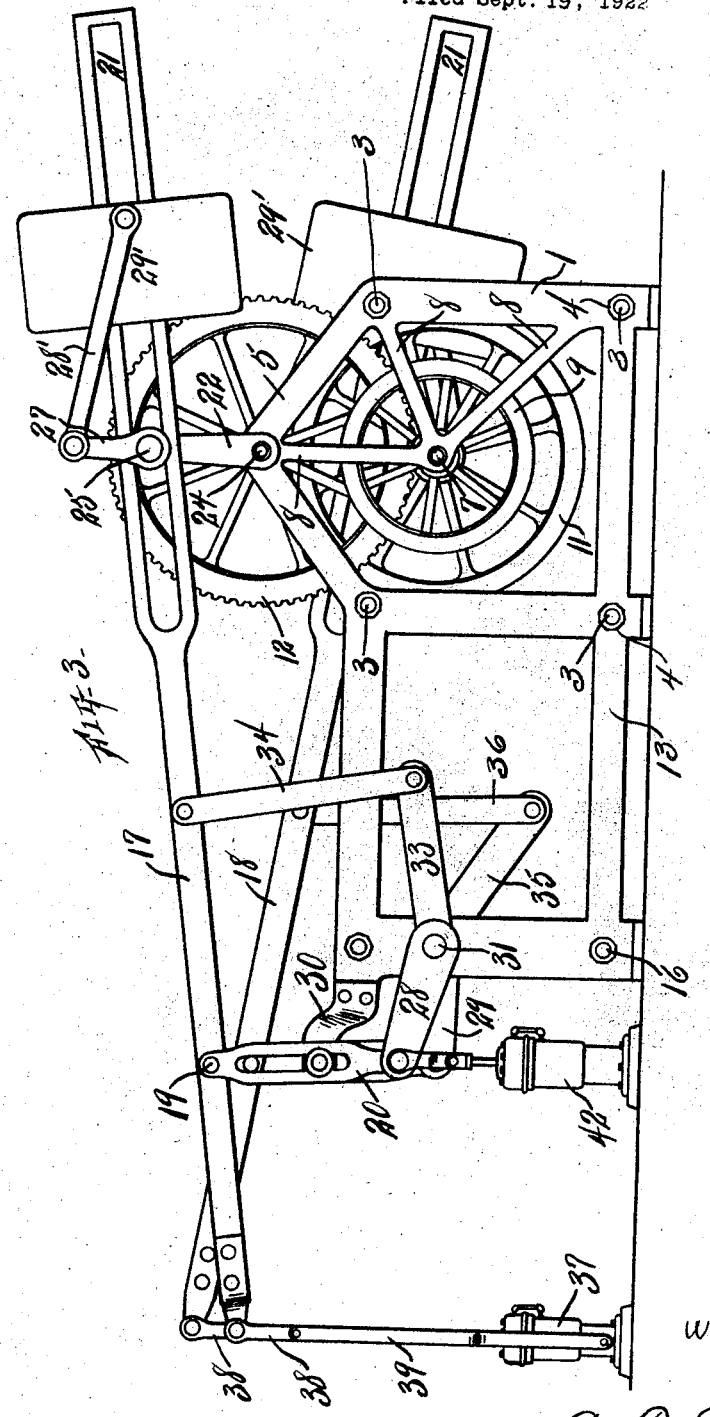
Inventor  
William L. Dayton  
By A. L. Jackson  
Attorney

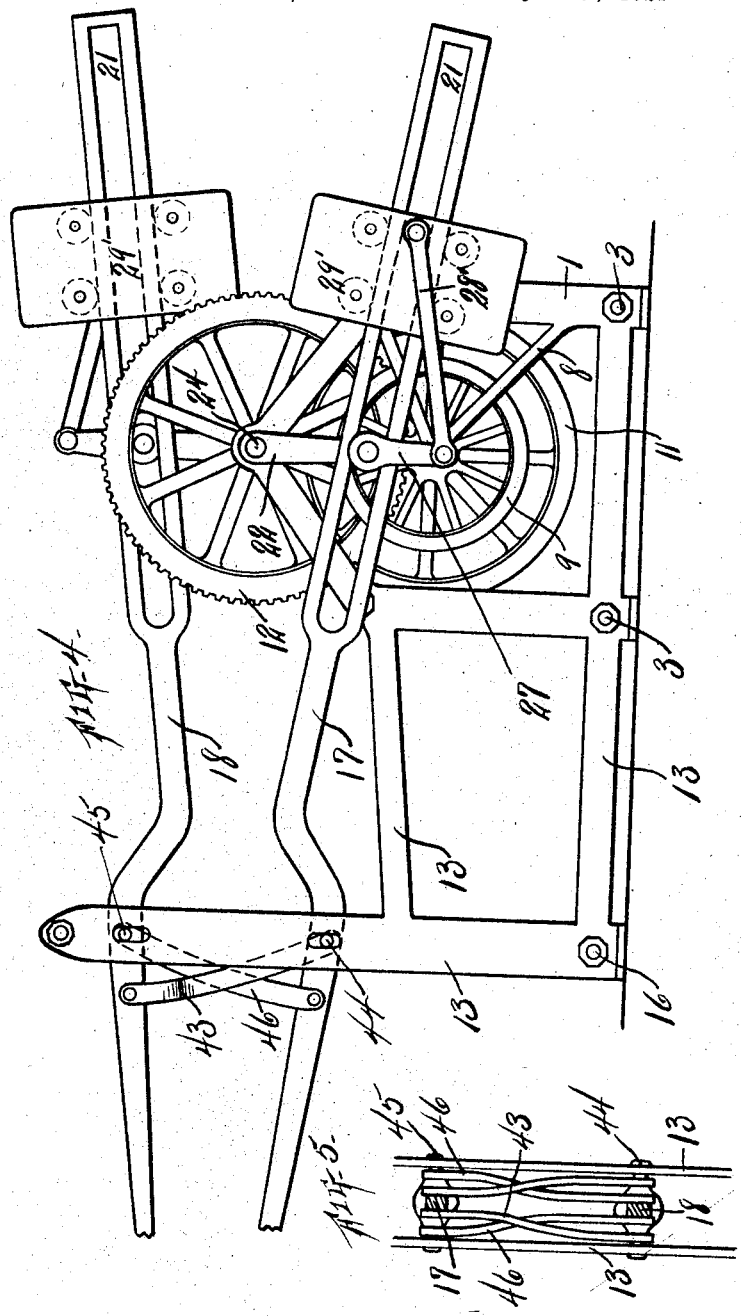

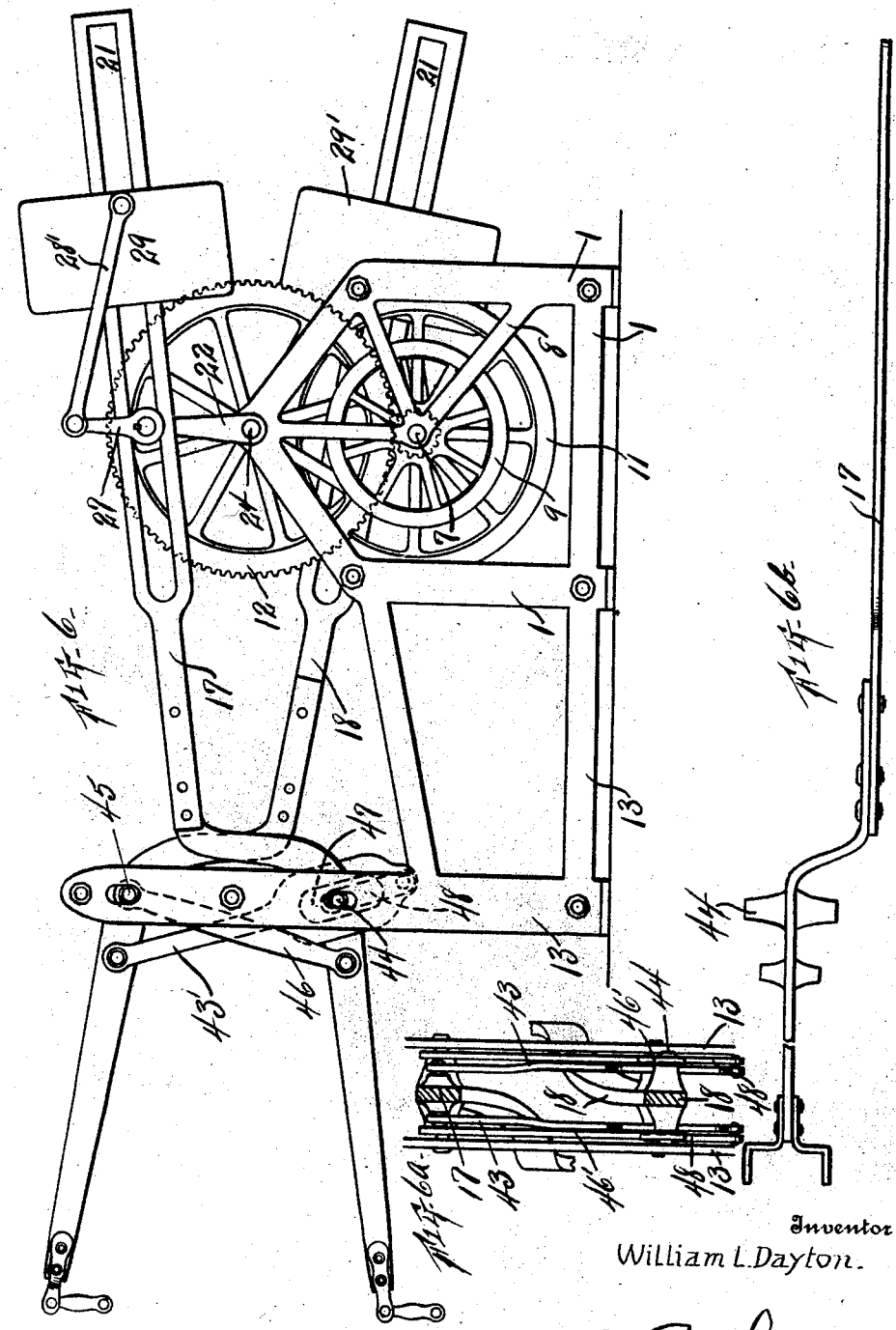

Sept. 23, 1924.
W. L. DAYTON
1,509,641
POWER JACK FOR COMPRESSORS AND THE LIKE
Filed Sept. 19, 1922   5 Sheets-Sheet 5
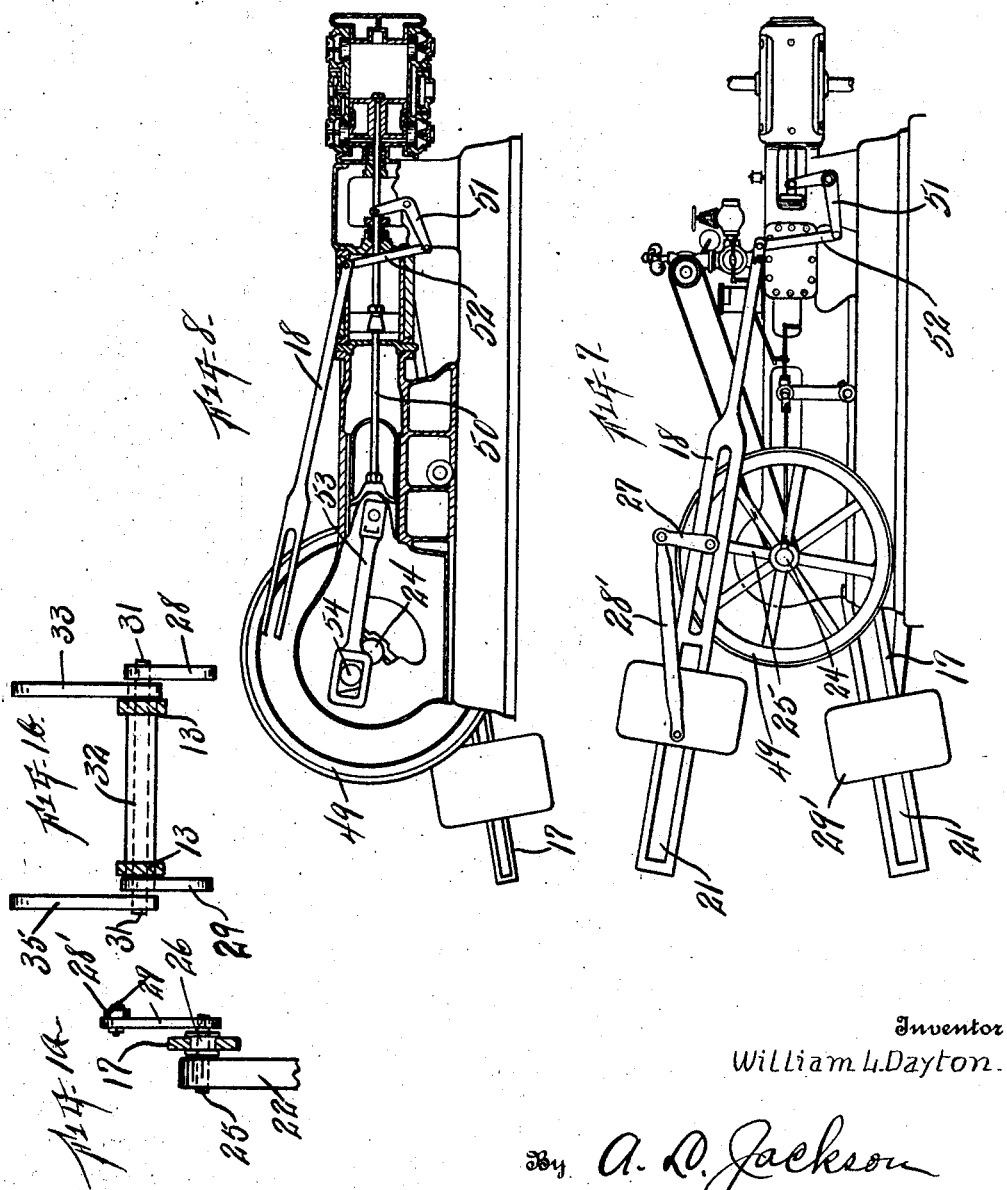
Inventor
William L. Dayton.
By A. D. Jackson
Attorney Patented Sept. 23, 1924.

1,509,641

UNITED STATES PATENT OFFICE.

WILLIAM L. DAYTON, OF FORT WORTH, TEXAS.

POWER JACK FOR COMPRESSORS AND THE LIKE.

Application filed September 19, 1922. Serial No. 589,107.

*To all whom it may concern:*

Be it known that I, WILLIAM L. DAYTON, a citizen of the United States, residing at Fort Worth, in the county of Tarrant and State of Texas, have invented certain new and useful Improvements in Power Jacks for Compressors and the like, of which the following is a specification.

My invention relates to power jacks and more particularly to power jacks for air compressors; and the object is to provide power jacks which can be operated with relatively a small amount of power and which will be highly efficient for compressing air, running a pump, or drilling wells, or accomplishing other useful purposes. Another object is to provide power jacks which will effect a great saving in power. Other objects and advantages will be fully explained in the following description and the invention will be more particularly pointed out in the claims.

Reference is had to the accompanying drawings which form a part of this application.

Fig. 1 is a side elevation of the improved power jack. Fig. 2 is a plan view of the same. Fig. 3 is a side elevation of a power jack, showing a slight variation from the power jack previously shown. Fig. 4 is a side elevation of a power jack, showing a slight variation from the power jacks previously shown. Fig. 5 is a detail view of the power applying means shown in Fig. 4. Fig. 6 is a side elevation of a power jack which is a slight variation from the power jacks previously shown. Fig. 7 illustrates one of the power jacks applied to a horizontal air compressor. Fig. 8 is a longitudinal section of the air compressor cylinders shown in Fig. 7. Fig. 1ª is a detail view of the crank connections with the walking beams. Fig. 1ᵇ is a detail view of the power shifting cranks and shafts. Fig. 6ª is an elevation of the walking beam connecting link bars and Fig. 6ᵇ shows one walking beam.

Similar characters of reference are used to indicate the same parts throughout the several views.

The power jack is provided with a pair of frame members 1 and 2 which are duplicates and these frame members are braced by cross rods or bars 3 which are provided with sleeves and suitable nuts 4. Bearings 5 are formed in the upper parts of the frame members and bearings 6 are provided for the main driving axle 7 and bearings 6 are supported by bracing frame members 8 which are rigid with the frame members 1 and 2. A power wheel 9 is rigid with the shaft 7. A drive pinion 10 is rigid with shaft 7 and a balance wheel 11 is rigid with the shaft 7. The pinion 10 drives a cog wheel 12 which is the power transmitting wheel. The power jack is provided with supplemental frame members 13 and 14 which are extensions of the members 1 and 2 respectively. The members 13 and 14 are braced by cross rods 15 and 16. Walking beams 17 and 18 are provided with movable fulcrums 19 which are carried by movable supports 20. The walking beams 17 and 18 have longitudinal slots 21 and these walking beams are actuated by cranks 22 and 23 which are rigid with the shaft 24 of wheel 12. The crank 22 is off-set to engage the walking beam 17 by means of a shaft 25 which projects through the slot 21 and is provided with a roller 26 to prevent friction of the shaft 25 against the beam 17. A crank 27 is rigid with shaft 25 and a link bar 28' is pivotally connected to the crank 27 and to the weight 29' which is movable on the beam 17. The beam 18 and its co-operating parts are duplicates in structure of the beam 17 and its co-operating parts. The beams 17 and 18 are pivotally connected to the vertically movable supports 20. The supports 20 are actuated by cranks 28 and 29 and for this reason, the supports 20 will have a slight swinging motion and the supports 20 are slotted and guides 30 are rigid with the extension frame 13 and project through the slots in the supports for preventing displacement of the beams 17 and 18 and cranks 28 and 29. The crank 28 is rigid with an interior shaft 31 and crank 29 is rigid with an exterior shaft 32. A crank 33 is rigid with the exterior shaft 32 and pivotally connected to a link bar 34. A crank 35 is rigid with the interior shaft 31 and pivotally connected to a link bar 36 which is pivotally connected to walking beam 18. The link bar 34 is pivotally connected to the link bar 17. The walking beams are operatively connected to air compressors 37 by suitable pitman rods 38 and connecting rods 39. The air compressors 37 are connected to a storage tank 40 by pipes 41.

The walking beams 17 and 18 are driven by gear wheel 12 and the wheel 12 is driven by the drive wheel 9 and pinion 10. When the beam 17 forces the pitman 34 downwardly, the crank 33 is actuated and this crank being rigid with exterior shaft 32 and as crank 29 is rigid with shaft 32, crank 29 moves the support of beam 18 upwardly and so moves the beam 18 upwardly. The weight 29' is moved by the crank 27 and as the work end of the beam 17 goes down, the weight 29' slides on the walking beam. The work end of the beam 17 reaches its lowest point when the crank 27 is in the position shown in Fig. 1. When the work end of beam 17 starts upwardly with its load, the weight 29' moves towards the power end of the beam 17 and so pulls on the load. When the work end of beam 17 is moving down, its movable support 20 is rising and so pushes upwardly on crank 28 and this action forces the crank 35 downwardly by means of the shaft 31. This causes the work end of the beam 18 to move downwardly. The walking beams 17 and 18 are thus operatively connected together so that these beams work alternately. Each beam operates in the same manner as the other. The walking beams 17 and 18 are so connected that they co-operate with each other and this co-operation is accomplished through the movable supports or fulcrums 19, the cranks 28 and 35 with shaft 31 and through cranks 33 and 29 with shaft 32. The force of the load on one walking beam will raise the weight on the opposite walking beam through the movable fulcrums and the crank connections through the exterior and interior shafts 31 and 32.

The devices shown in Fig. 3 are substantially the same as the devices shown in Figs. 1 and 2. Provision is made for operating two more compressors 42 which are operatively connected to the movable supports 20.

The devices shown in Fig. 4 are operated by the same power mechanism, as shown in the previous views. A pair of link bars 43 are pivotally connected to the walking beam 17. A cross bar 44 is carried rigidly in the beam 18 and projects through slots in the frame pieces 13. The link bars 43 engage this cross bar 44. Link bars 46 are pivotally connected to the beam 18 and pivotally connected to the cross-bar 45. The frame pieces 13 are slotted so that the bars 43 and 46 will have movement relative to frame pieces 13. The operation will be similar to the operation of the previously described machine.

The machine shown in Figs. 6, 6ª, and 6ᵇ is similar to the machine shown in Fig. 4. The only difference is the connection of the link bars 44 with the beam 18. The bars 43' are wider at their lower ends and have slots 47 to receive the ends of the cross bar 44. Supplemental link bars 48 are pivotally connected to the lower ends of the link bars 43' and pivotally connected to the ends of the cross bar 44. This arrangement of parts gives a swinging pivotal motion. The link bars 46 are pivotally connected to walking beams 17 and 18 and the link bars 43' and 46 will have a limited vertical motion by reason of the slots in the frame pieces 13. The operation is similar to the operation of the previously described devices.

Figs. 7 and 8 show the power jack applied to a horizontal air-compressor of ordinary type, the frame and gearing being omitted. A power transmitting wheel 49 is made rigid with shaft 24. The air compressor is provided with a plunger rod 50 and bell-crank levers 51 which are fulcrumed on the frame of the compressor. The bell crank levers 51 are pivotally and adjustably connected to the plunger rod 50. The walking beams 17 and 18 are pivotally connected to link bars 52 which are pivotally connected to the bell-crank levers 51. The wheel 49 is provided with a wrist pin 54 and a pitman rod 53 is pivotally connected to this wrist pin and pivotally connected to the plunger rod 50. This arrangement of parts gives two power appliances to the plunger rod 50.

What I claim, is,—

1. A power jack having a frame, a driven shaft journaled in said frame, a pair of fulcrums carried by said frame, a pair of walking beams mounted on said fulcrums and operatively connected together, a power transmitting shaft journaled in said frame, slidable weights mounted on said walking beams, cranks rigid with said power shaft and operatively connected to said weights, and gearing driven by said driven shaft for operating said cranks for actuating said walking beams and said weights.

2. A power jack having a frame, a driven shaft journaled in said frame, a pair of movable fulcrums carried by said frame, a pair of walking beams mounted on said fulcrums, link bars and shafts operatively connecting said fulcrums and walking beams, a power transmitting shaft journaled in said frame, slidable weights mounted on said walking beams, cranks rigid with said power transmitting shaft and operatively connected to said weights and projected oppositely and operatively connected to said walking beams, and gearing for driving said power transmitting shaft from said driven shaft.

3. A power jack having a frame, a driven shaft journaled in said frame, a pair of movable fulcrums carried by said frame, a pair of walking beams mounted on said fulcrums, driving means for actuating said walking beams alternately from said driven shaft, and means operatively connecting said walking beams to each other for making said beams aid each other in operation.

4. A power jack having a frame, a driven shaft journaled in said frame, a pair of movable fulcrums carried by said frame, a pair of walking beams mounted on said fulcrums, driving means for actuating said walking beams alternately from said driven shaft, and means actuated by said movable fulcrums and operatively connecting said walking beams to each other for making said beams aid each other in operation, said means including an interior shaft journaled in said frame and operatively connected at one end to one of said movable fulcrums and operatively connected at the other end to one of said walking beams and an exterior shaft journaled on said interior shaft and operatively connected at one end to the other movable fulcrum and at the other end operatively connected to the other walking beam.

In testimony whereof, I set my hand, this 16th day of September, 1922.

WILLIAM L. DAYTON.